A. BRISBANE.
VEHICLE WHEEL.
APPLICATION FILED MAY 31, 1907.
959,707.
Patented May 31, 1910.
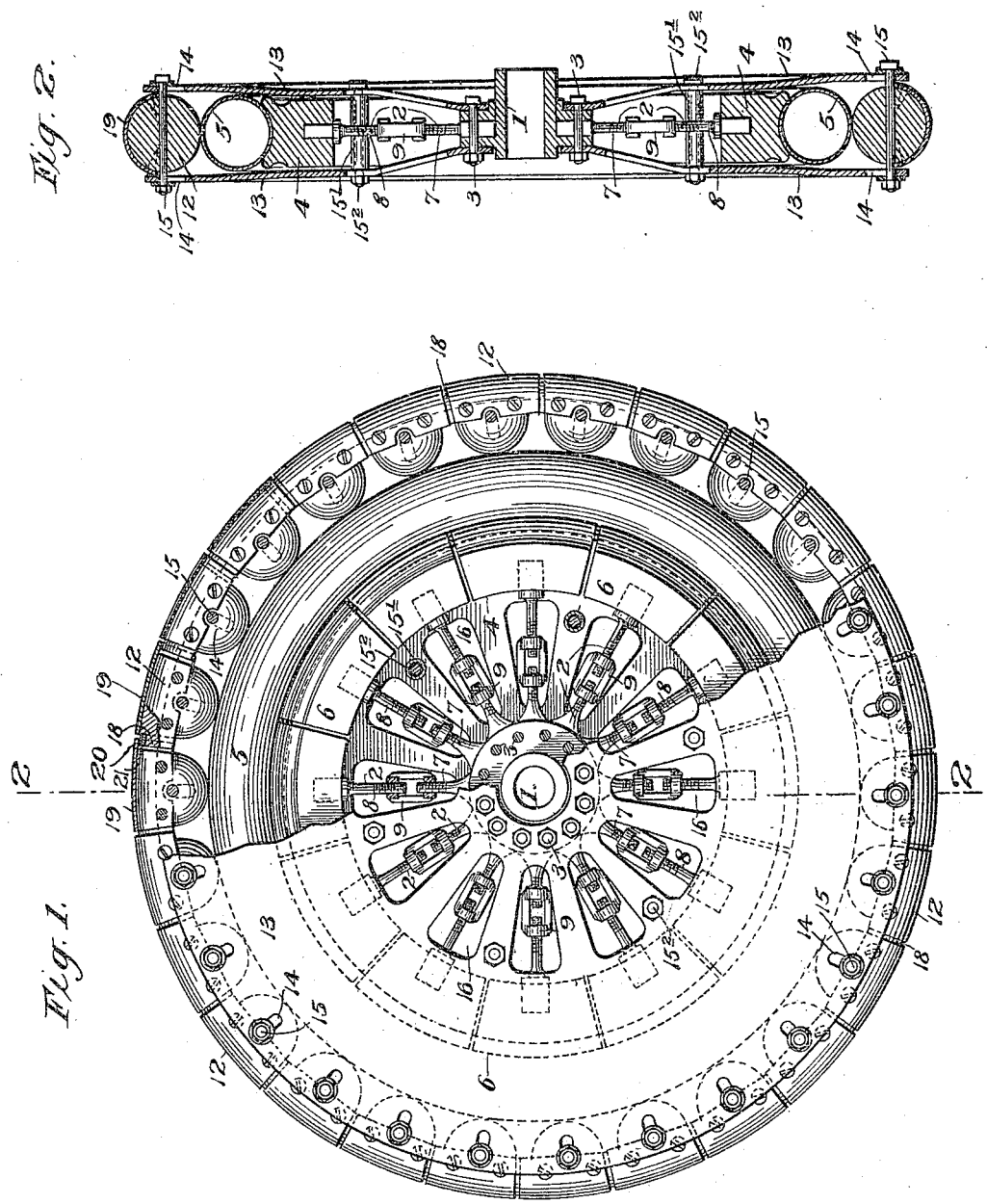

UNITED STATES PATENT OFFICE.

ARTHUR BRISBANE, OF NEW YORK, N. Y.

VEHICLE-WHEEL.

959,707.	Specification of Letters Patent.	Patented May 31, 1910.

Application filed May 31, 1907. Serial No. 376,689.

*To all whom it may concern:*

Be it known that I, ARTHUR BRISBANE, a citizen of the United States, residing at New York city, county of New York, and State of New York, have invented certain new and useful Improvements in Vehicle-Wheels, fully described and represented in the following specification and the accompanying drawings, forming a part of the same.

This invention relates to improvements in vehicle wheels.

Wheels for motor and like vehicles have heretofore been provided with ordinary pneumatic tires for taking up the shocks caused by any unevenness in the surface over which the vehicle passes. These pneumatic tires are very expensive, both because of the high first cost and because of their liability to puncture and the rapidity with which they wear out. It has been proposed to substitute for these pneumatic tires a tube of steel or other resilient metal, this tube of resilient metal forming the tread surface of the wheel. This tube, to afford the desired resilience and elasticity has to be made very thin. The prior constructions embodying tubes were found to be unsatisfactory on account of this thinness, as they were liable to be dented or broken by stones and other obstructions on the surface over which the wheel passed.

It is one object of the present invention to produce a wheel for motor and like vehicles in which is used a tube of resilient metal of sufficient thinness to give the desired resiliency, and in which this tube is kept out of direct contact with the surface over which the wheel passes, the tube being placed on the inside of the wheel and provided with a separate outer or tread surface so that, not being subjected to direct wear, it will not be broken or otherwise injured by any unevenness in the surface over which the wheel passes.

It is a further object of the invention to provide an improved means for holding the tube in position on the wheel.

It is a still further object of the invention to produce a construction which will be simple to make and attach, durable, and the parts of which, which are subjected to direct wear, when worn out may be readily replaced with new parts.

For a full understanding of the invention, a detailed description of the same will now be given in connection with the accompanying drawings, in which:—

Figure 1 is a side view of a vehicle wheel embodying the invention, partly in section, certain parts being broken away for illustrative purposes; Fig. 2 is a vertical section on line 2—2 of Fig. 1.

Referring now to said drawings, which illustrate one embodiment of the invention, 1 indicates the hub of the wheel, which hub is of the usual construction, to which hub are bolted spokes 2 at their inner extremities by bolts 3. These spokes 2 are secured at their outer extremities to a spoke rim or felly 4, and support the same.

The tube, marked 5 in the drawings, which forms the resilient element of the wheel, may be varied somewhat in construction and in the manner in which it is supported and held in position on the wheel. It will, however, be supported by the felly and will extend around the outer periphery thereof. In the preferred construction, and as shown, the tube 5 is a tube of thin resilient metal, preferably thin steel, this metal being chosen because of its combined resiliency and strength. The tube 5 furthermore is preferably a continuous air or gas tight tube, the meeting edges of the tube being welded together by electric welding or in any other suitable manner, so as to form a continuous air tight body, the tube being used alone, without any interior lining. When the tube is in this form, means are provided for getting the tube in position on the felly and for holding the tube in position when put on, and a construction for this purpose will now be described.

As shown, the felly 4 is a sectional felly made up of a plurality of sections 6, these sections 6 being arranged so that they may be collapsed or expanded to increase or diminish the circumference of the felly, so that the tube may be placed on the felly when collapsed, and when in position, the felly may be expanded against the tube and thus hold it firmly in position. The means for adjusting the felly sections may be varied. As shown, the spokes 2 are divided spokes, each spoke being divided at or about its middle into two parts 7 and 8, these parts being provided with right and left hand screw threads. In the particular construction shown, one felly section is provided for each spoke, though it will be understood that two or more spokes may be used for each felly section, if desired. The ends of the parts 7 and 8 of each of the divided spokes are secured together by adjustable couplings 9, these couplings, in the form shown, being right and left hand nuts. By adjusting these nuts, the felly sections 6 may be moved and the periphery of the felly increased or diminished to the size necessary to get the tube in position and hold it.

In accordance with the invention the steel tube is so arranged on the wheel as to be kept out of direct contact with the surface over which the wheel travels, this result being accomplished by the use of a special tread surface. This tread surface includes a plurality of tread members composed of some suitable durable material, all or any one of which may be removed when injured. This tread surface is furthermore so arranged as to contact with the tube of resilient metal, as shown, and the tread members are so arranged as to have a limited movement toward and away from the tube to compensate for any unevenness in the surface over which the wheel passes, thus providing the necessary resiliency or elasticity.

The construction and arrangement of the tread members which form this tread surface may be somewhat varied. There will be, however, a plurality of tread members 12, the particular number of which may be varied. A sufficient number will be provided, however, and they will be set sufficiently close together to form in effect a practically continuous tread surface. These tread members may be of any suitable configuration, as for instance in the forms shown in my applications Serial Nos. 371,871 and 371,872, filed May 4, 1907, and are preferably made of wood, though metal or hard rubber or other suitable material may be employed, if desired. These tread members contact with the tube and are mounted so as to have a limited radial movement with respect thereto, so that when the tread members are forced down on to the resilient tube they give the desired resiliency or elasticity to the wheel, and at the same time prevent injury to the tube. These tread members may be mounted on the wheel in any desired manner to give this result. In the construction shown, there are provided side plates 13. These side plates extend around the circumference of the wheel at the side, and are secured at their inner edges to the hub of the wheel in any suitable manner as by the spoke-bolts 3, so that they can be readily removed if it becomes necessary, for any reason, to get at the tube. These side plates are independent of the felly, so that the felly sections can be adjusted inside the plates and without interference therefrom. These plates 13 are slotted at their upper extremities as shown at 14, and in these slots 14 are adapted to work bolts 15 by which the tread members 12 are carried and supported. The members 12 thus have a movement with respect to the tube, this movement being limited by the depth of the slots. These slots are so positioned in the plates and the tread members are of such dimensions, that the outer edges of the side plates will not come in contact with the surface over which the wheel passes.

To strengthen the side plates and prevent them from buckling, spacing bars are employed, these latter being positioned so as not to interfere with the adjustment of the felly sections. The spacing bars comprise hollow sleeves 15', the sleeves being held in position by bolts $15^2$.

In order that the adjusting couplings or nuts 9 may be readily gotten at, the side plates 13 are apertured, as shown at 16 in Fig. 1, this construction permitting easy access to the couplings for adjusting the felly sections. Means are also preferably provided by the present invention for preventing the entrance of dust and dirt between the tread members. The tread members 12 are formed with a shoulder or projection 18, one of these shoulders being formed on one side or end of each member, these shoulders being formed by cutting away the member at the desired point. Each member is covered or sheathed with some durable material, this covering in the particular construction shown being a thin sheet of a suitable metal 19 secured to the member in any desired manner. This strip of metal covers the tread surface of the member, extending down over the sides thereof below the upper edges of the side plates 13 and projects slightly beyond the top or tread surface and the sides of the members at the side or end opposite the shoulder, as shown at 20, so that it laps over the shoulder of the next succeeding member and protects the top and side spaces between the members, as clearly shown in Fig. 1. A second narrow strip of metal 21 is bent over the shoulders or projections 18 and extends down over the sides of the projections or shoulders below the upper edges of the side plates, this second strip lying under the first strip on the shoulder, as shown in Fig. 1, and forming a wearing surface on which the strips 20 rub, or wear. This construction effectually prevents the entrance of dust or dirt between the tread members. These sheathing strips 20 also have the function of preventing the tread members from sliding or slipping when passing over a wet or slippery surface.

The specific construction hereinbefore described of the tread surface, and the means for preventing the entrance of dust and dirt between the tread members of the tread surface are not claimed herein, but are claimed in application filed by me Serial No. 371,872, filed May 4, 1907, hereinbefore referred to.

What I claim is:—

1. In a vehicle wheel, the combination of a sectional spoke rim or felly, an air or gas tight tube of resilient metal supported by the felly and extending completely around the outer periphery thereof, means for moving the sections of the felly whereby its circumference is increased or decreased to hold the tube in position or permit its removal, a hub, slotted side plates secured to the hub at their inner edges, and a plurality of tread members having curved tread surfaces forming the tread surface of the wheel mounted in said side plates so as to contact with said resilient body and have a limited movement with respect to said tube.

2. In a vehicle wheel, the combination of a sectional spoke rim or felly, an air or gas tight tube of resilient metal extending completely around the outer periphery thereof, divided spokes secured to the felly, adjusting nuts connecting the ends of the divided spokes for moving the sections to increase or decrease the circumference of the felly, a hub, side plates secured to the hub at their inner edges, said side plates being apertured to permit access to the adjusting nuts, slots in the upper edges of the side plates, and a plurality of tread members having curved tread surfaces forming the tread surface of the wheel mounted in said slots so as to contact with said tube and have a limited movement with respect thereto.

In testimony whereof, I have hereunto set my hand, in the presence of two subscribing witnesses.

ARTHUR BRISBANE.

Witnesses:
J. A. GRAVES,
P. B. PHILIPP.